June 21, 1938.  G. LERAY  2,121,566

HIGH INTENSITY REFLECTOR

Filed March 1, 1933  2 Sheets-Sheet 1

Inventor:
Gustave Leray,
by E. F. Wenderoth
Atty.

June 21, 1938.  G. LERAY  2,121,566

HIGH INTENSITY REFLECTOR

Filed March 1, 1933  2 Sheets-Sheet 2

Inventor:
Gustave Leray,
by E. F. Wenduoth
Atty.

Patented June 21, 1938

2,121,566

UNITED STATES PATENT OFFICE 2,121,566

HIGH INTENSITY REFLECTOR

Gustave Leray, Paris, France, assignor, by mesne assignments, to Otto R. Barnett, Chicago, Ill.

Application March 1, 1933, Serial No. 659,219
In France March 4, 1932

8 Claims. (Cl. 88—82)

Numerous known optical devices possess the property of reflecting the luminous rays which they receive from a source of light independent of them. This property is made use of, in particular, in signalling and for night advertising. The systems embodying this condition are extremely varied, each one of them moreover, possessing peculiar properties.

A high intensity autocollimator embodying this invention is characterized by the fact that the refracting and reflecting surfaces are each in the form of surfaces of revolution and each has the same axis of revolution, a meridian of the device showing that the refracting surface is of prolate elliptical curvature and that the reflecting surface is of oblate elliptical curvature, with the major axes of both surfaces being angularly related.

The reflecting surface is positioned at the focus of the refracting surface so as to result in the impinging light rays returning to a point approximating their source.

Autocollimating devices embodying this invention may be either of the solid one-piece glass type having convex objective and reflecting surfaces or of the type in which the objective lens is separated from the reflecting surface by an air space.

The primary object is to provide a highly efficient autocollimating device that will return to a point approximating the source of the light a beam of strong intensity for a considerable distance.

Another object is to provide such an improved autocollimating device that will efficiently return the light ray to a point approximating its source, whether the source be located at a point adjacent the axis of revolution of the structure or at points at various angles to the axis of revolution.

Other objects and advantages will become apparent from an examination of the following detailed description.

Figure 1:
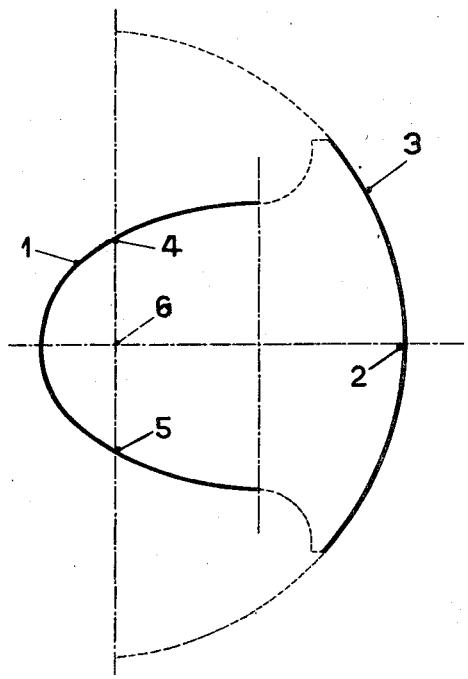
Fig. 1 is a sectional view of one form of autocollimating device embodying this invention.
Figure 2:
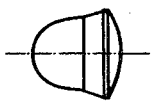
Fig. 2 is a side elevation of an autocollimator embodying this invention.

Referring to Fig. 1, reference character 1 indicates the refracting surface of the device of prolate elliptical curvature and 3 indicates the reflecting surface of oblate elliptical curvature, positioned through the point 2 which is the focus of rays of light impinging upon the refracting surface 1 and parallel to the axis of the structure. The foci of the elliptical reflecting surface 3 are indicated at points 4 and 5 which are located on or near the ellipse forming the refracting surface 1.

The foci of the ellipse forming the refracting surface 1 are indicated at points 6 and 2 and it is to be noted that the foci of the reflecting surface are so positioned relative to the refracting surface that a straight line drawn through the two foci will also go through point 6.

The major axes of both refracting and reflecting surfaces are perpendicular and the major axis of the refracting surface is coincident with the axis of revolution of the device. In such a construction the direction of maximum autocollimation is at a point adjacent or on the axis of revolution.

Figure 3:
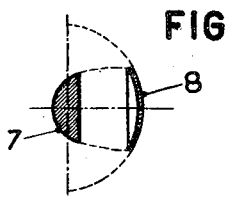
Fig. 3 is a sectional view of a device embodying this invention in which the object lens is separated from the reflecting portion of the device by an air space.

Reference character 7 in Fig. 3 indicates the refracting surface of a two-piece device and reference character 8 indicates the mirror or reflecting surface.

Figure 4:
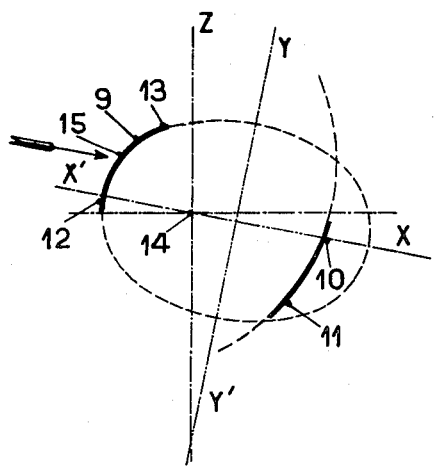
Fig. 4 is a diagram illustrating a sectional view of another form of device embodying this invention.

The structure illustrated in Fig. 4 is directed to a situation in which the desired direction of maximum autocollimation is at an angle to the axis of revolution of the device. In this case the line Z indicates the axis of revolution of the device, the line X—X', the major axis of the refracting elliptical surface, and the line Y—Y', the minor axis of the refracting elliptical surface.

The reflecting surface is also of elliptical curvature, 12 and 13 indicating the foci for such ellipse. 9 indicates the portion of the ellipse forming the refracting surface that is used in constructing the device and 11 indicates the portion of the ellipse forming the reflecting surface that is used in constructing the device. Reference character 10 indicates the focal point of rays of light impinging upon the refracting surface in the direction indicated by the arrow.

The point 14 indicates the intersection of the axis of rotation Z and the major axis X—X' of the refracting surface 9, which point is preferably located at or near the approximate center of curvature of a curve most nearly approaching and coinciding with the portion 9 of the ellipse.

If for any reason it is desirable to replace elliptical curve 11 with an arc of a circle, 15 indicates the preferable center of curvature for such an arc.

It can clearly be seen that in a structure built in accordance with Fig. 4, both the major axes of the refracting and reflecting surfaces form acute angles with the axis of revolution of the device and with each other. The approximate direction of maximum autocollimation is indicated by the arrow.

Figure 5:
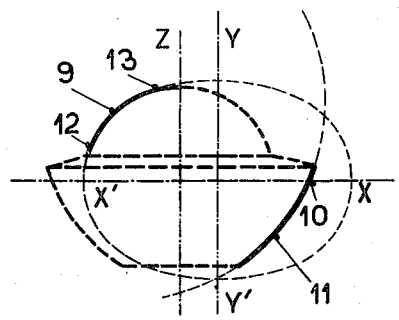
Fig. 5 is a diagram illustrating a sectional view of still another form of device embodying this invention.
Figure 6:
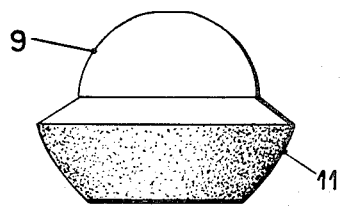
Fig. 6 is an elevation view of a device constructed in accordance with this invention.
Figure 7:
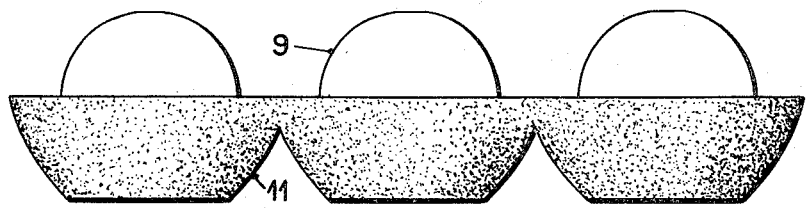
Fig. 7 is an elevation view showing a group of 5 such devices molded together.

The structure illustrated in Fig. 5 is similar to that shown in Fig. 4, excepting that the major axis of the ellipse forming the refracting surface is perpendicular to the axis of rotation of the device and the minor axis of the ellipse forming the refracting surface is parallel to and spaced from the axis of rotation.

A specific example of the measurements of a device constructed in accordance with Fig. 1 follows:

The ellipse from which is determined the refracting surface has a half major axis of 13.5 mm. and a half minor axis of 10 mm., assuming the refraction index of the glass to be 1.517.

The focal point 2 is positioned 22 mm. from the apex of the refracting surface.

The half major axis of the ellipse forming the reflecting surface is 19.1 mm. and the half minor axis, 17.5 mm.

A specific example of the measurements of a device constructed in accordance with Fig. 4 follows:

The half major axis of the ellipse from which the refracting surface is formed is 13.3 mm. in length and the half minor axis 10 mm. in length, again assuming the index of refraction of the glass to be 1.517.

The distance from summit X' to focal point 10 is 22.1 mm. and point 14 is 9.4 mm. from the summit. The minor axis Y—Y' of the ellipse forming the refracting surface forms an acute angle of 11° with the axis of rotation Z.

What I claim is:

1. A high intensity autocollimator comprising a refracting surface and a reflecting surface each of which is in the form of a surface of revolution and having the same axis of revolution, a meridian of the device showing the refracting surface to be elliptical, the long axis of which is parallel to the axis of revolution, and the reflecting surface to be elliptical, the long axis of which is perpendicular to the axis of revolution.

2. A high intensity autocollimator comprising a refracting surface and a reflecting surface each of which is in the form of a surface of revolution and having the same axis of revolution, a meridian of the device showing the refracting surface to be elliptical, the two axes of which are substantially in the ratio of 20 to 27, the major axis being coincident with the axis of revolution, and the reflecting surface to be elliptical, the axes of which are substantially in the ratio of 38.2 to 35, the minor axis being coincident with the axis of revolution.

3. A high intensity autocollimator comprising a refracting surface and a reflecting surface each of which is in the form of a surface of revolution and having the same axis of revolution, a meridian of the device showing the refracting surface to be elliptical, the two axes of which are substantially in the ratio of 20 to 27, the major axis being coincident with the axis of revolution, and the reflecting surface to be elliptical, the axes of which are substantially in the ratio of 38.2 to 35, the minor axis being coincident with the axis of revolution, the foci of the reflecting elliptical surface positioned substantially on the refracting surface and the summit of the reflecting surface positioned substantially at the focus of the refracting surface.

4. An auto-collimating device made of light refracting material having a front surface in the form of a prolate ellipsoid, having its major axis coincident with the axis of the device, and an opposed rear reflecting surface substantially in the form of an oblate ellipsoid having its minor axis coincident with the axis of the device, said last named surface containing that focus of the prolate ellipsoid which is more distant from the front apex of the button.

5. A high intensity autocollimator comprising a refracting surface and a reflecting surface, each of which is in the form of a surface of revolution and having the same axis of revolution, a meridian of the device showing the refracting surface to be of prolate elliptical curvature and the reflecting surface to be of oblate elliptical curvature, the major axes of the refracting and reflecting elliptical surfaces being angularly related.

6. A high intensity autocollimator comprising a refracting surface and a reflecting surface, each of which is in the form of a surface of revolution and having the same axis of revolution, a meridian of the device showing the refracting surface to be of prolate elliptical curvature and the reflecting surface to be of oblate elliptical curvature, the major axis of the refracting elliptical surface forming an acute angle with the axis of revolution of the device.

7. A high intensity autocollimator comprising a refracting surface and a reflecting surface, each of which is in the form of a surface of revolution and having the same axis of revolution, a meridian of the device showing the refracting surface to be of prolate elliptical curvature and the reflecting surface to be of oblate elliptical curvature, the major axis of the refracting elliptical surface forming an acute angle with the axis of revolution of the device and with the minor axis of the reflecting elliptical surface.

8. A high intensity autocollimator comprising a refracting surface and a reflecting surface, each of which is in the form of a surface of revolution and having the same axis of revolution, a meridian of the device showing the refracting surface to be of prolate elliptical curvature and the reflecting surface to be of oblate elliptical curvature, the major axis of the refracting elliptical surface forming an acute angle with the axis of revolution of the device and with the minor axis of the reflecting elliptical surface, and said minor axis also forming an acute angle with the axis of revolution.

GUSTAVE LERAY.